United States Patent
Bielby

(10) Patent No.: US 11,720,231 B2
(45) Date of Patent: Aug. 8, 2023

(54) VEHICLE HAVING AN INTELLIGENT USER INTERFACE

(71) Applicant: Micron Technology, Inc., Boise, ID (US)

(72) Inventor: Robert Richard Noel Bielby, Placerville, CA (US)

(*) Notice: Subject to any disclaimer, the term of this patent is extended or adjusted under 35 U.S.C. 154(b) by 0 days.

(21) Appl. No.: 17/545,899

(22) Filed: Dec. 8, 2021

(65) Prior Publication Data

US 2022/0100333 A1    Mar. 31, 2022

Related U.S. Application Data

(63) Continuation of application No. 16/892,133, filed on Jun. 3, 2020, now Pat. No. 11,231,834.

(51) Int. Cl.
| | |
|---|---|
| G06F 3/0482 | (2013.01) |
| G06F 3/01 | (2006.01) |
| G06F 3/0483 | (2013.01) |
| G06N 20/00 | (2019.01) |
| G06N 5/04 | (2023.01) |

(52) U.S. Cl.
CPC ............ *G06F 3/0482* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,726,688 A | 3/1998 | Siefert et al. | |
| 7,124,004 B2 | 10/2006 | Obradovich | |
| 8,458,748 B2 | 6/2013 | Thomas et al. | |
| 8,581,749 B2 | 11/2013 | Wohlert et al. | |
| 8,977,109 B2* | 3/2015 | Barcons-Palau | G06V 20/40 386/282 |
| 9,082,239 B2 | 7/2015 | Ricci | |
| 9,165,280 B2 | 10/2015 | Basson et al. | |
| 9,507,413 B2 | 11/2016 | Gee | |
| 9,513,698 B2 | 12/2016 | Grossman | |
| 9,592,779 B2 | 3/2017 | Pietsch et al. | |
| 10,115,130 B1 | 10/2018 | Webster | |
| 10,218,847 B1 | 2/2019 | Webster | |
| 10,710,594 B2 | 7/2020 | Zhao et al. | |
| 11,231,834 B2 | 1/2022 | Bielby | |
| 2006/0190822 A1 | 8/2006 | Basson et al. | |
| 2007/0124046 A1 | 5/2007 | Ayoub et al. | |
| 2012/0143391 A1 | 6/2012 | Gee | |
| 2015/0169044 A1 | 6/2015 | Grossman | |

(Continued)

*Primary Examiner* — Jordany Nunez
(74) *Attorney, Agent, or Firm* — Greenberg Traurig

(57) ABSTRACT

Embodiments of the present disclosure relate to a vehicle user interface. The vehicle user interface may receive user input from an input system. It may present user selectable options or prompt user action via an output system. The vehicle user interface may transmit, via a communication interface, to a computing system a series of user inputs received from at least the first input system, wherein the computing system is configured to extract at least one feature from the series of user inputs and generate a prediction model based on the at least one feature. At least one predicted option may be identified based on the prediction model. The vehicle user interface may instruct the first output system to present the at least one predicted option.

20 Claims, 7 Drawing Sheets

(56) References Cited

U.S. PATENT DOCUMENTS

| | | |
|---|---|---|
| 2016/0132195 A1 | 5/2016 | Seto et al. |
| 2017/0032402 A1 | 2/2017 | Patsiokas et al. |
| 2017/0061965 A1 | 3/2017 | Penilla et al. |
| 2018/0081507 A1 | 3/2018 | Wengelnik et al. |
| 2018/0178808 A1* | 6/2018 | Zhao .................... B60K 28/066 |
| 2018/0181359 A1 | 6/2018 | Monroe et al. |
| 2018/0204231 A1 | 7/2018 | Mccormick |
| 2020/0034848 A1 | 1/2020 | Seo et al. |
| 2020/0152197 A1 | 5/2020 | Penilla et al. |
| 2020/0218696 A1 | 7/2020 | Camhi et al. |
| 2021/0061471 A1 | 3/2021 | Bates et al. |
| 2021/0382586 A1 | 12/2021 | Bielby |

\* cited by examiner

VEHICLE HAVING AN INTELLIGENT USER INTERFACE

RELATED APPLICATIONS

The present application is a continuation application of U.S. patent application Ser. No. 16/892,133 filed Jun. 3, 2020, the entire disclosure of which application is hereby incorporated herein by reference.

BACKGROUND

Vehicles are equipped with a control panel or user interface to allow a user to change and configure vehicle settings. A user may need to navigate through extensive menus to identify a desired selection each time he or she is transported in the vehicle. A user may interact with a vehicle be pressing buttons or turning knobs. A display screen in the vehicle may present options and show user selections.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

Various embodiments of the present disclosure relate to a vehicle user interface that implements predictive behavior in presenting selectable options for a user who may wish to configure the vehicle. A vehicle may include several input systems such as, for example, cameras, microphones, and sensors that monitor a user's activities. A computing system (e.g., cloud-based system) may use the data received from these input systems to determine the intention of the user, the need of the user, the patterns of activities of the users, etc. The computing system may employ machine learning to generate predictive models based on patterns in the way the user has configured the vehicle. For example, a cloud-based service may predict the possible user interaction activities and generate a smooth user interface for interaction with the driver or passengers.

For example, voice prompts may be configured to narrow down options to enable an easy response that may be made with less distraction. In some embodiments, user inputs such as a gesture, a voice response, and/or a fuzzy combination thereof, may be used to train a machine learning module for accuracy in determining the intention of the driver. Thus, computing system may predict user selections based on past interactions with the vehicle.

In some embodiments, the computing system may identity the driver to present a customized user interface for the driver specifically. The customized user interface may comprise a filtered list of menu options based on past interactions. While the foregoing provides a high level summary, the details of the various embodiments may be understood with respect to the figures.

Figure 1:
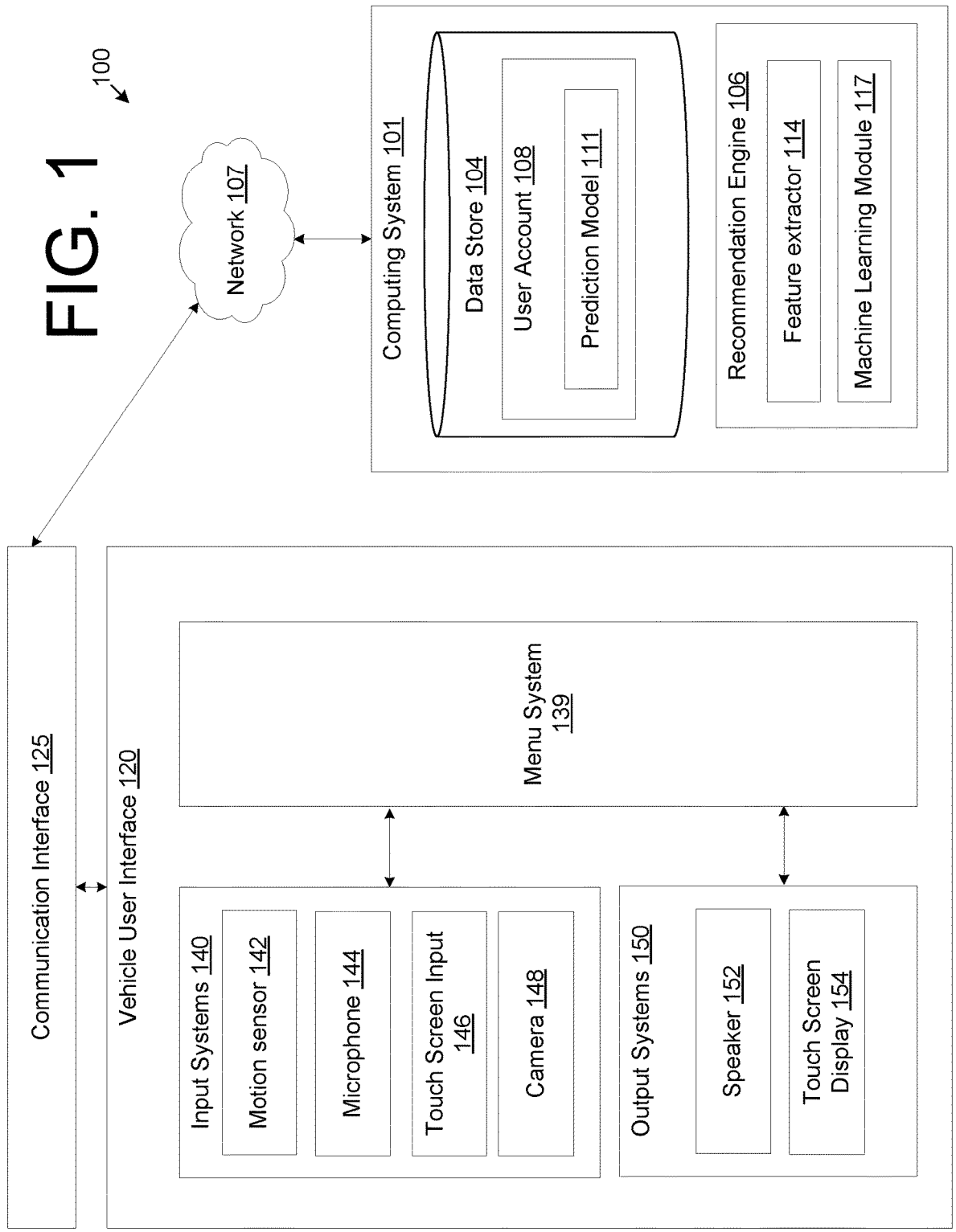
FIG. 1 is a drawing of a networked environment according to various embodiments of the present disclosure.

FIG. 1 shows a networked environment 100 according to various embodiments. The networked environment includes a computing system 101 that is made up of a combination of hardware and software. The computing system 101 includes a data store 104, and a recommendation engine 106. The computing system 101 may be connected to a network 107 such as the Internet, intranets, extranets, wide area networks (WANs), local area networks (LANs), wired networks, wireless networks, or other suitable networks, etc., or any combination of two or more such networks.

The computing system 101 may comprise, for example, a server computer or any other system providing computing capability. Alternatively, the computing system 101 may employ a plurality of computing devices that may be arranged, for example, in one or more server banks or computer banks or other arrangements. Such computing devices may be located in a single installation or may be distributed among many different geographical locations. For example, the computing system 101 may include a plurality of computing devices that together may comprise a hosted computing resource, a grid computing resource and/or any other distributed computing arrangement. In some cases, the computing system 101 may correspond to an elastic computing resource where the allotted capacity of processing, network, storage, or other computing-related resources may vary over time. The computing system 101 may implement one or more virtual machines that use the resources of the computing system 101.

Various applications and/or other functionality may be executed in the computing system 101 according to various embodiments. Also, various data is stored in the data store 104 or other memory that is accessible to the computing system 101. The data store 104 may represent one or more data stores 104. This data includes, for example, user accounts 108. A user account 108 includes information to identify a user such as a user identifier (ID), username, biometric data, voice samples, vehicle settings, and other data that is specific to a user. The data stored in a user account 108 may be used to automatically recognize or identify a user in a vehicle.

A user account 108 may also include a prediction model 111 for a specific user of the user account 108. The prediction model 111 may include data received from a user as he or she interacted with a vehicle that is then processed by an artificial intelligence module to predict user selections and/ or present a customized user interface. Accordingly, the probability model 111 may comprise processed user input data that is used to predict future user input.

As mentioned above, the components executed in the computing system 101 may include a recommendation engine 106, which may access the contents of the data store 104. The recommendation engine 106 may comprise a feature extractor 114 and a machine learning module 117. The feature extractor 114 may receive a series of user inputs and extract one or more features from the user input. A feature may be, for example, signature in the user input such as a specific sequence of data. The feature extractor 114 may be configured to operate according to a plurality of rules for identifying features that are considered relevant. A rule implemented by the feature extractor 114 may be, for example, a rule to identify when two distinct inputs are received within a predetermined period of time.

The machine learning module 117 may comprise a supervised learning module and/or an unsupervised learning module. A supervised learning module may comprise a classifier that is trained according to training data. The classifier may be used in generating recommended user-selectable options. An unsupervised learning module may employ a clustering analysis to identify closely related data and/or a neural network to implement pattern recognition in the data. This may be used to generate a predictive model. Thus, the machine learning module 117 may be configured to create a predictive model based on received user input from a vehicle. As new user input is received, the predictive model may be continuously validated, adjusted, or modified. In addition, the predictive model may be used to generate predicted options for a vehicle user interface 120 based on past behavior. These predicted options may be presented in a customized user interface, where the customized interface includes one or more predicted options that are filtered based on user behavior.

The computing environment 100 also includes a vehicle user interface 120 coupled to a communication interface 125. The vehicle user interface 120 and communication interface 125 may be installed or otherwise implemented in a vehicle. The vehicle user interface 120 may be implemented as a combination of hardware and software for allowing a user of the vehicle to make, edit, modify, or adjust user settings of the vehicle. For example, the vehicle user interface 120 may comprise a menu system 139. The menu system 139 may include a plurality of user selectable options to configure the vehicle. In some embodiments, the menu system is a hierarchical menu system comprising a tree of options that allows a user to select an option through multiple steps. The menu system 139 may be stored in memory associated with the vehicle user interface 120.

The vehicle user interface 120 may comprise input systems 140 such as, for example, a motion sensor 142, microphone 144, a touch screen 146, a camera 148, or other devices that facilitate the receipt of user input. An input system 140 receives user input at the vehicle. The user input may include a voice command, tactile touch, actuation of a button, knob, switch, or scroller, a gesture, posture when sitting in a vehicle seat, biometric input, or any other input from a user in the vehicle. The user input is sensed through one or more of the input systems 140 in the vehicle. User input may be used to navigate the menu system 139. In some embodiments, user input is not used to navigate the menu system 139, but rather a result of human behavior as the user operates the vehicle. User input may also include input to operate the vehicle such as starting the vehicle, braking, stopping the vehicle, or otherwise operating the vehicle. Such user input may be sensed by an input system 140 that detects how the user is operating the vehicle or the user's behavior when being transported. The input systems 140 may be used to monitor user activities as the user is transported in the vehicle.

The motion sensor 142 may detect the presence of a user and the user's location within the vehicle (e.g., driver or passenger). The motion sensor 142 may detect gestures from a user. Other sensors may be used such as weight sensors in the vehicle seat or infrared sensors to detect pets and other living objects in the vehicle. One or more microphones 144 may be used to detect user speech. In some embodiments, microphones 144 may be used to detect the direction or location of the user within the vehicle.

A touch screen input 146 may be used to receive user input as a user touches a touch screen 146. The touch screen input 146 may comprise a capacitive touch screen. Multiple touch screen inputs may be used to obtain user input from different passengers in the vehicle.

The camera 148 may be a video camera that detects video in the vehicle. The camera may capture still images or video clips for purposes of detecting user input and/or identifying the user through facial recognition.

The vehicle user interface 120 may comprise output systems 150 such as, for example, a speaker 152, touch screen display 154, or other devices that facilitate the audio or visual presentation of information to a user. The output systems 150 may work with the menu system 139 to present user selectable options for the user. These user selectable options may be presented visually through, for example, the touch screen display 154 or other visual display. These user selectable options may be presented audibly through, for example, one or more speakers 152 that audibly present a menu options of the menu system 139. The output systems 150 may prompt a user for additional user input or request confirmation of a user selection.

In some embodiments, an input system 140 and output system 150 may be implemented within the same input/output device to facilitate both input and output. For example, the touch screen display 154 and touch screen input 146 may be implemented as touch screen device that facilities both input and output.

The vehicle user interface 120 may be coupled to the communication interface 125 to communicate with a computing system 101 over a network 107. The communication interface may comprise, for example, a wireless receiver, wireless transmitter, a modem, or other device that provides communication over the network 107.

Next is a general description of the operations of components of the networked environment 100 according to some embodiments. A vehicle may be a car, truck, or other machine to transport individuals. The vehicle includes various automotive systems for causing the vehicle to move. These automotive systems may be operated by a user, by autonomous driving systems, or a combination thereof. A user may be a passenger or a driver who is being transported by the vehicle. During transportation, a user may use the vehicle user interface 120 to configure the vehicle. This is described in more detail with respect to FIG. 2. In addition, the user's behavior, whether navigating a menu system 139 or not, may be sensed through one or more input systems 140.

This user activity over time may comport to specific user behavior or habits. For example, a user may typically turn on the radio and select internet radio as the source input when the user enters the car. In another example, the user may typically adjust the climate to a particular temperature after the user selects a radio station. In another example, the user may typically listen to the radio when in a slouched posture but not listen to the radio when the user sits up in an upright position. In another example, the user may typically turn off the defroster after 10 seconds of turning it on. These non-limiting examples illustrate various behaviors or habits that a user may exhibit within a vehicle.

In some embodiments, a series of user inputs is captured by one or more input systems 140 and transmitted to the computing system 101 via the communication interface 125. In some embodiments, the computing system 101 receives the series of user inputs as a data stream. In some embodiments, the computing system 101 may associate the series of user inputs to a particular user based on a user account 108. For example, prior to receiving the series of user inputs, the computing system 101 may authenticate the user based on, for example, a login operation, a voice recognition operation, facial recognition, or a biometric scan. The computing system 101 may also authenticate the user automatically based on information contained in the series of user inputs such as voice data, facial recognition, or biometrics.

By associating a user identifier with the received series of user inputs, the computing device 101 may generate a customized user interface by presenting one or more predicted options to the user who may wish to navigate the menu system 139. For example, the computing device 101 may provide a filtered set of menu options upon identifying a user. Here, if the user typically does not select a particular menu item, that menu item may be hidden upon detecting the identity of the user. In this respect, a limited menu may be presented in response to identifying the user. The limited menu is based on past interactions and may include predicted options.

The computing system 101 performs feature extraction on the received series of user inputs using a feature extractor 114. For example, the feature extractor 114 may search for signatures within the series of user inputs. In some embodiments, signatures are detected if they occur within a predetermined period of time. A machine learning module 117 may analyze the features in the series of user inputs to generate a prediction model 111 and store it in a corresponding user account 108.

For example, if a user typically turns on the radio and chooses internet radio as the input source when the user enters the car, a series of user inputs would indicate that a particular selection in a menu system occurs soon after a vehicle start event. This series of user inputs may be received by the feature extractor 114, where the feature extractor extracts a feature corresponding to a sequence of "start vehicle" and "internet radio selection" occurring within a predetermined period of time. In other words, this feature is a signature reflecting a particular sequence of events. The machine learning module 117 may analyze this feature to generate a corresponding prediction model 111. For example, the machine learning module 117 may continue to analyze different series of input to establish a confidence level several detected features indicate the presence of behavioral pattern. The machine learning module 117 may generate a prediction model 111 based on analyzing features. In some embodiments, the analysis of features to generate the prediction model is performed by an unsupervised machine learning model. In this response, no training data is needed to configure the prediction model 111. Rather, the prediction model 111 is developed automatically overtime by observing how the driver interacts with the user interface to make predictions in the future.

Once a prediction model 111 is generated, the machine learning module 117 may continue to validate or test it. For example, the machine learning module 117 may check to see if subsequent series of input contain the same pattern. Analyzing additional user inputs may strengthen or weaken a prediction model 111.

The machine learning module 117 may apply the prediction model 111 to a subsequent series of input to generate a predicted option. Building on the example above, the recommendation engine 106 may generate a predicted option for the user to listen to internet radio in response to the vehicle being started. This predicted option may be conveyed to the vehicle user interface 120. In response, the vehicle user interface 120 may present the predicted option via an output system 150. In some embodiments, the vehicle user interface 120 may automatically play, via a speaker 152, a message indicating a selection of internet radio in response to the vehicle being started. In another example, the vehicle user interface 120 may automatically display, via touch screen 152, a menu selection to play internet radio upon the vehicle being started.

In some embodiments, if a user agrees or otherwise accepts the predicted option, the machine learning module 117 records the result and reinforces the prediction model 111 such that the predicted model is associated with a higher confidence. If a user disagrees or otherwise denies the predicted option, the machine learning module 117 may lower the confidence of the prediction model 111. Thus, in some embodiments, prediction models 111 are dynamically being created and updated according to a corresponding confidence level. Prediction models 111 corresponding to a confidence level above a threshold may be applied while prediction models 111 corresponding to a confidence level below a threshold may not be applied.

In some embodiments if the confidence level exceeds a threshold, the vehicle user interface 120 may implement the predicted option without requiring the confirmation ahead of the implementation. In other words, rather than presenting the predicted option, the vehicle user interface automatically selects the predicted option. The vehicle user interface 120 may provide an option or opportunity for the user may provide instructions to override the automatic selection or instruct the vehicle user interface 120 to not automatically select the predicted option in the future. As a result, the prediction model 111 may be updated based on the user's feedback or instructions regarding the automatic selection.

Figure 2:
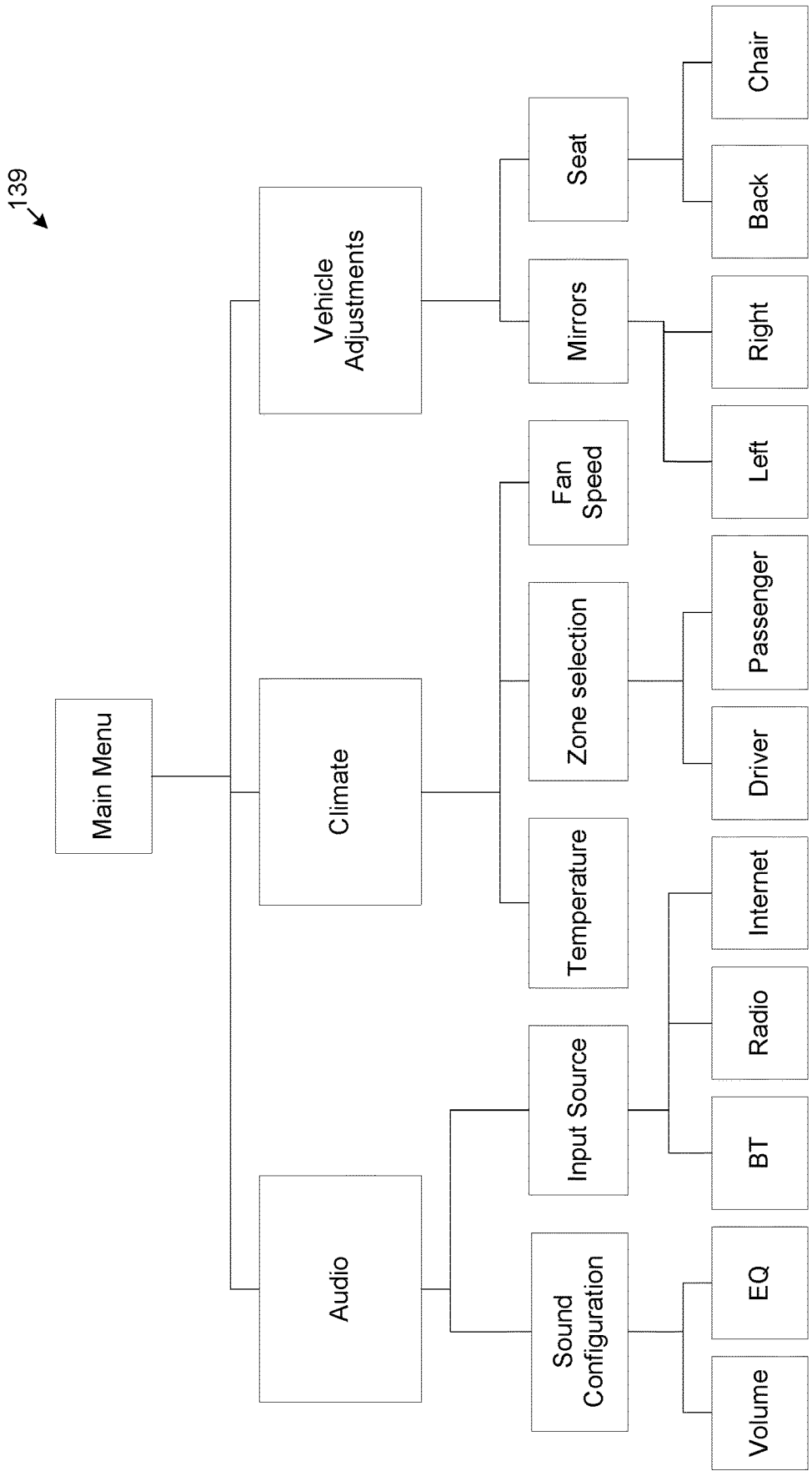
FIG. 2 is a drawing of menu system implemented by a vehicle user interface in the networked environment of FIG. 1 according to various embodiments of the present disclosure.

FIG. 2 is a drawing of menu system 139 implemented by a vehicle user interface 120 in the networked environment 100 of FIG. 1 according to various embodiments of the present disclosure. FIG. 2 depicts a menu system that is tiered to allow a user to select a high-level option (e.g., audio, climate, vehicle adjustments), and drill down to more specific settings (e.g., volume, equalizer (EQ), Bluetooth (BT), Radio, Internet, Driver, Passenger, Left, Right, Back, Chair, etc.).

A user may find it time consuming to select "Internet" as an input source using a tiered menu system 139. For example, a user may select "Audio", then "Input Source", then "Internet Radio." In this respect, the user spends time navigating through a series of menu tiers of a menu system 139 to eventually make a selection.

Embodiments of the present disclosure are directed to predicting selections and presenting a predicted option or a filtered set of predicted options based on past behavior. In some embodiments, the recommendation engine 106 learns to determine/predict what the user wants to do through observing a series of user inputs and through machine learning. For example, if the vehicle learns that the user is likely to select a temperature after selecting "Input Source" and "Bluetooth", the vehicle user interface 120 may present a predicted option to select a temperature by, for example, asking the user to confirm via a voice prompt. Without the predicted option, a user may need to select "Climate" and then "Temperature" through one or more input systems 140 to make the selection.

In some embodiments, the vehicle user interface 140 may present the predicted option by automatically selecting menu items for the user to arrive at the final screen of the menu system 139. Then, the user may then be ready to directly select the predicted option without manually navigating through several tiers. In some embodiments, the predicted option is presented among a plurality of other options that have been filtered down to increase the ease in navigating the menu system.

Figure 3:
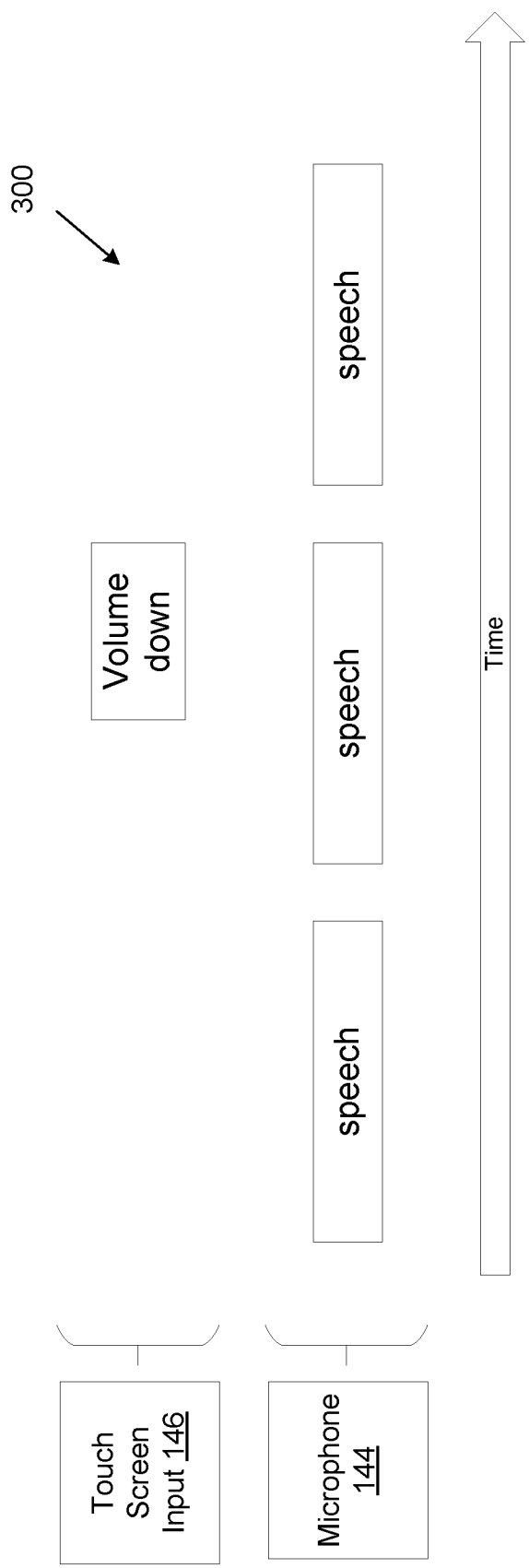
FIG. 3 is a drawing of an example of operations implemented by a recommendation engine in the networked environment of FIG. 1 according to various embodiments of the present disclosure.

FIG. 3 is a drawing of an example of operations implemented by a recommendation engine 106 in the networked environment 100 of FIG. 1 according to various embodiments of the present disclosure. Specifically, FIG. 3 depicts a machine learning example 300 that illustrates an embodiment of the recommendation engine 106.

The recommendation engine 106 may be configured to receive a series of user inputs or monitors for user activities in the vehicle, perform feature extraction, and generate a prediction model 111 having a confidence level. In the machine learning example 300, there is a first input system comprising a touch screen input 136 and a second input system comprising a microphone 144. These input systems 140 capture user input or monitor for user activity and transmit it as a series of user inputs or data indicating the monitored user activity that is then received by the recommendation engine 106.

In this machine learning example 300, a vehicle is playing music through the vehicle's audio player (e.g., radio). Meanwhile, users engage in a conversation. A user eventually turns down the volume to make it easier to listen to the conversation. As shown in the machine learning example 300, speech is received from the microphone 114 over time. The speech corresponds to the conversation between different passengers in the vehicle. The series of user inputs or user activity also includes the input or action of turning the volume down as the vehicle plays music through a speaker 152.

A feature extractor 114 may identify a feature present in the series of user inputs or user activity. For example, a feature extractor 114 may be configured to operate according to a set of rules to search for features. One example of a rule is to search for two separate user inputs that are near in time. In the machine learning example 300, the feature may indicate that speech is detected for a predetermined period of time and then the volume of the music is reduced to a specified level. More specifically, the feature may reflect that about 10 seconds of continuous microphone input is received followed by an input to turn the volume down to about level 3.

The recommendation engine 106 continues to extract different features as it continuously receives different series of user inputs or user activity over time. Eventually, multiple features are extracted from the different series of user inputs or activity. A machine learning module 117 may perform a clustering analysis to cluster together similar features into a cluster. For example, a cluster may contain the following four features:

<9 seconds of speech followed by the volume reduced to level 2>;
<15 seconds of speech followed by the volume being reduced to level 2>;
<12 seconds of speech followed by the volume reduced to level 4>; and
<19 seconds of speech followed by the volume being reduced to level 3>

These four features are relatively similar in the sense that the each involve continuous speech followed by a volume reduction input. When a cluster emerges from the plurality of extracted features, the recommendation engine 106 generates a prediction model 111. The prediction model 111 may comprise the individual features in the cluster. The prediction model 111 may also comprise an average feature of the cluster, which may be calculated by taking the mean values of a feature when plotted in a feature vector space. The prediction model 111 may comprise the size of cluster space in terms of the average distance between features when plotted in a feature vector space or the radius of the cluster. The features in a feature vector may be specific user inputs (e.g., a detection of speech, a volume selection, etc.), the timing between different user inputs, a specific parameter of a user input (e.g., setting the volume to a particular level, etc.). The prediction model 111 may comprise a confidence level that corresponds to the tightness of the cluster and the number of features within a cluster. For example, the more features there are in a cluster and the smaller the average distance is between features within the cluster, the greater the confidence level is.

While the example above describes an unsupervised learning embodiment of the machine learning module 117, some embodiments are directed to a machine learning module 117 that includes supervised learning. For example, a user may manually tag or label features as relevant or irrelevant to assist the machine learning model 117 in creating a prediction model 111.

In the machine learning example 300, a prediction model 111 is generated, where the prediction model 111 is used to generate a recommendation for turning the volume down in response to detecting input from a microphone that lasts for 10 seconds. Once this prediction model 111 is generated and applied, the detection of 10 seconds of microphone input while music is playing in the background may generate a predicted option to lower the volume of the music.

The predicted option may be conveyed to the vehicle user interface 120. In some embodiments, the vehicle user interface 140 presents the predicted option to the user using an output system 150. For example, the output system 150 may visually display the predicted option or audibly play the predicted option to the user. In some embodiments, the vehicle user interface 120 automatically implements the predicted option. In some embodiments, the vehicle user interface 120 presents a notification as it implements the predicted option to allow the user to override the predicted option. Depending on how the user responds to the presentation of the predicted option, the machine learning module 117 may update the corresponding prediction model 111.

Figure 4:
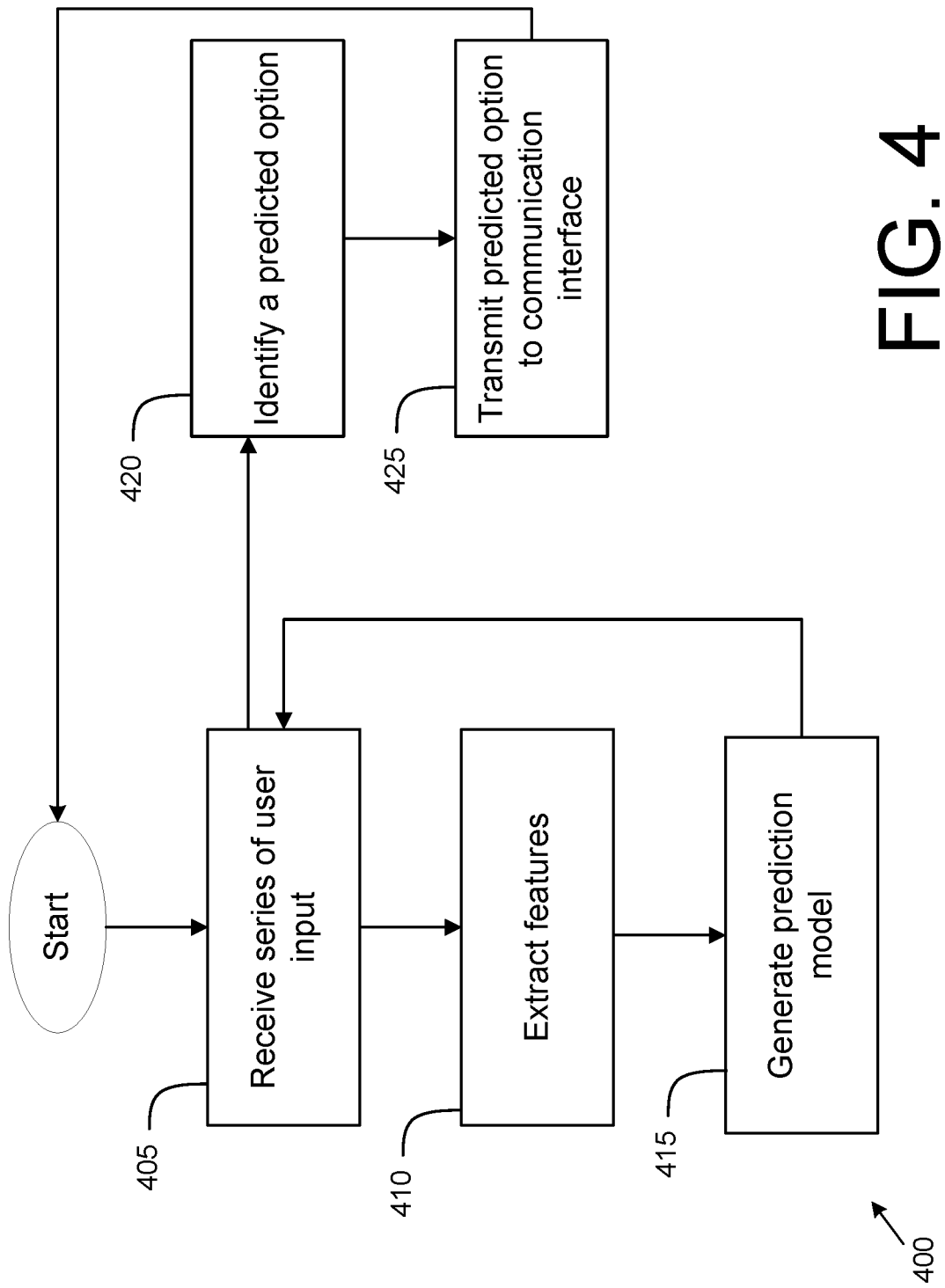
FIG. 4 is a flowchart illustrating an example of the functionality implemented by a computing system in in the networked environment of FIG. 1 according to various embodiments of the present disclosure.

FIG. 4 is a flowchart illustrating an example of the functionality implemented by a computing system 101 in in the networked environment of FIG. 1 according to various embodiments of the present disclosure. For example, the functionality of FIG. 4 may be implemented by a recommendation engine 106. It is understood that the flowchart of FIG. 4 provides merely an example of the many different types of functional arrangements that may be employed by the computing system 101 described herein. The flowchart of FIG. 4 may be viewed as depicting an example of elements of a method 400 implemented in the computing system 101 according to one or more embodiments.

At item 405, the computing system 101 receives a series of user inputs or a set of user activity. The series of user inputs or set of user activity may be received from a communication interface 125 of a vehicle. The communication interface 125 may relay the series of user inputs or set of user activity from a vehicle user interface 120 coupled to the communication interface 125. One or more input systems 140 may be used to obtain the series of user inputs or obtain user activity. The series of user inputs or set of user activity may be a continuous data stream received by the computing system 101.

At item 410, the computing system 101 may extract one or more features expressed in the series of user inputs or data indicating user activity. The computing system 101 may use a feature extractor 114 that operates according to a plurality of rules to identify features contained in the series of user inputs or data indicating user activity. For example, the feature extractor 114 may search for the existence of a sequence of user input such as the way a user navigates menu items of a menu system 139. The feature extractor 114 may also search for a sequence of user inputs that contain specific events such as the way the vehicle is operated in connection with when and what user settings are specified in the menu system. For example, turning a vehicle off or on coupled with another user input may form a sequence that is detectable by the feature extractor 114. Features may be stored in a data store 104 for further analysis.

At item 415, the computing system 101 generates a prediction model 111. For example, the computing system 101 may perform a clustering analysis on features to identify a cluster of similar features. The computing system 101 may employ a neural network to identify one or more rules that characterize a feature. In other embodiments, the computing system 101 may obtain training data for training a classifier to classify features. Training data may be provided by a user to specify types of rules or user interface options he or she prefers. A classifier may be trained to classify features.

The prediction model 111 corresponds to a rule that should be applied in the presence of specific input conditions. The rule may be an "if this, then that" statement. The prediction model 111 is generated in response to a repeated pattern in behavior of interacting with a vehicle user interface 120. The prediction model 111 is stored in a data store 104 and continuously updated as new series of user inputs are received or as new user activity is monitored.

At item 420, the computing system 101 may identify a predicted option. This may occur in parallel as the computing system 101 generates, builds, or updates prediction models 111. The predicted option may be generated by analyzing a series of user inputs or data indicating user activity and checking for conditions that relate to a rule of a prediction model 111. For example, a prediction model 111 may be defined in the case where a user is likely to adjust the temperature to a particular temperature after the user selects a radio station. In run time, if the radio station is selected, as indicated in the series of user inputs or data indicating user activity, then the computing system 101 generates a predicted option to adjust the temperature based on past behavior. In some embodiments, item 420 may occur in parallel with respect to items 410 and 415. For example, the computing system may generate prediction models 111 while also identifying predicted options based on the prediction models 111. Thus, a training mode and a run time mode as shown in FIG. 4 may occur simultaneously where the training mode builds predictive models 111 and run time mode implements them.

At item 425, the computing system 101 transmits the predicted option to a communication interface 125. The predicted option may be received by the vehicle user interface 120 and presented to the user.

Figure 5:
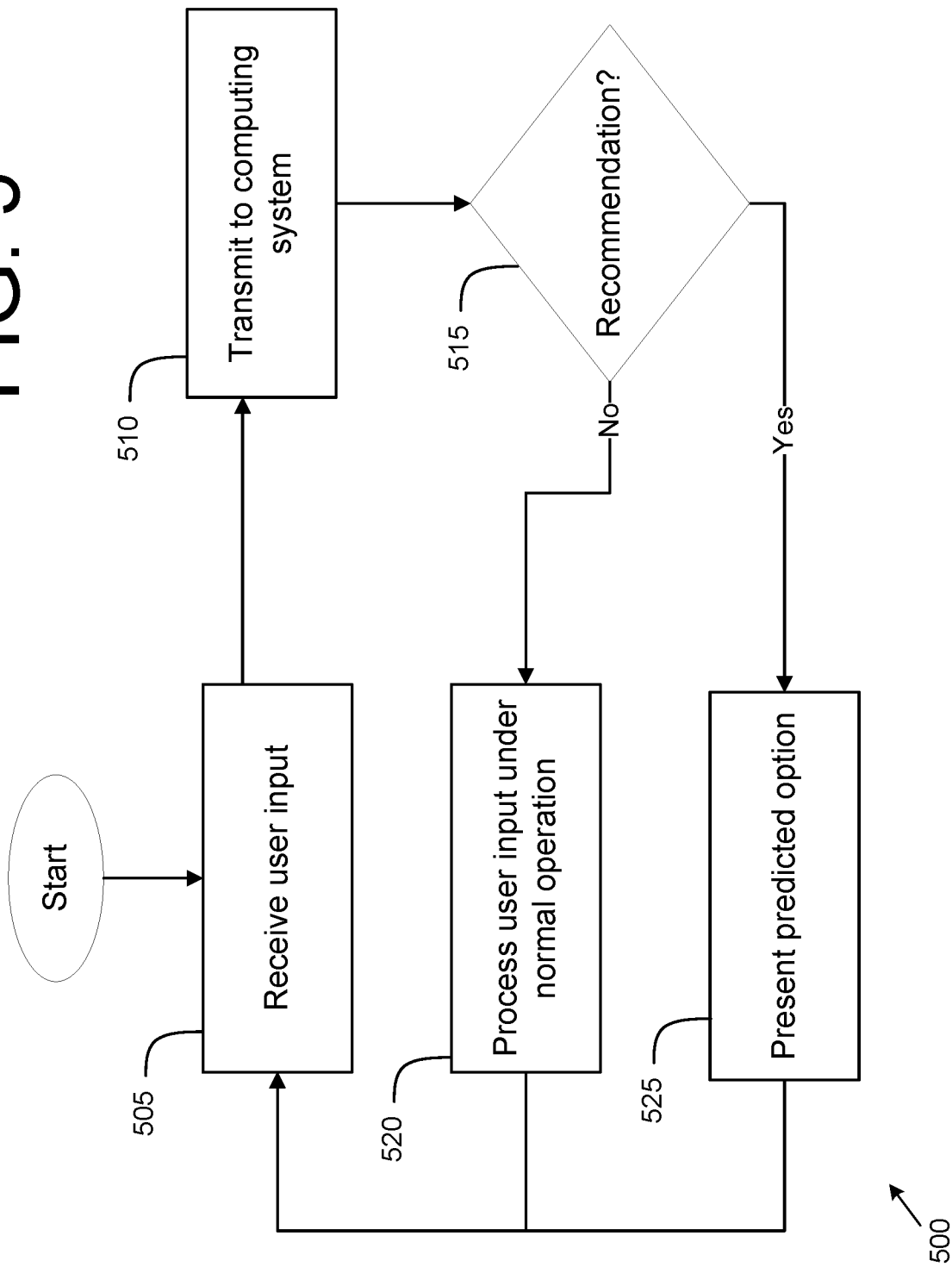
FIG. 5 is a flowchart illustrating an example of the functionality implemented by a vehicle in in the networked environment of FIG. 1 according to various embodiments of the present disclosure.

FIG. 5 is a flowchart illustrating an example of the functionality implemented by a vehicle in in the networked environment of FIG. 1 according to various embodiments of the present disclosure. For example, the functionality of FIG. 5 may be implemented in a vehicle user interface 120. It is understood that the flowchart of FIG. 5 provides merely an example of the many different types of functional arrangements that may be employed in a vehicle as described herein. The flowchart of FIG. 5 may be viewed as depicting an example of elements of a method 500 implemented in the vehicle according to one or more embodiments.

At item 505 the vehicle user interface 120 receives user input. One or more input systems 140 may be used to obtain the user input. The user input may be received as part of the user's interaction with a menu system 139 or it may be received by input systems 140 such as, for example, sensors, that continually detect users in a vehicle regardless of whether they are navigating a menu system 139. In addition, user input may comprise signals corresponding to the user who is operating the vehicle. For example, this includes starting the vehicle, stopping the vehicle, braking, steering, accelerating, idling, or any input used to control the vehicle.

At item 510, the vehicle user interface 120 transmits a series of user inputs or data indicating user activity to a computing system 101. The vehicle user interface 120 may use a communication interface 125 to transmit the series of user inputs or data indicating user activity wirelessly to the computing system 101. The series of user inputs may be a continuous data stream of user input collected from several input systems 140.

At 515, the vehicle user interface 120 may receive a recommendation for a predicted option. If no predicted option is received, then, at item 520, the vehicle user interface 120 processes user input under normal operation. For example, if the user navigates a menu system 139 using an input system 120, the vehicle user interface 120 continues to allow the user to navigate the menu system without presenting any predicted options or filtered menu items based on past behavior. If the user input is not intended to control the menu system 139, then, nothing may happen and the user may operate the vehicle under normal circumstances.

If a recommendation for a predicted option is generated, then the predicted option may be received by the vehicle user interface 120. At 525, the vehicle user interface 120 presents the predicted option to the user. For example, the vehicle user interface 525 may instruct an output system 150 to present the at least one predicted option.

In some embodiments, a speaker 152 is configured to present the predicted option by playing an audio output to obtain confirmation from a user. For example, the audio output may be an audio clip asking the user to confirm implementing the predicted option by providing an input via one or more of the input systems 140.

In some embodiments, the predicted option is automatically selected by the vehicle user interface 120. For example, if the prediction model 111 that identifies the predicted option has a sufficiently high confidence level, then the predicted option may be automatically selected such that it is implemented without human intervention.

Figure 6:
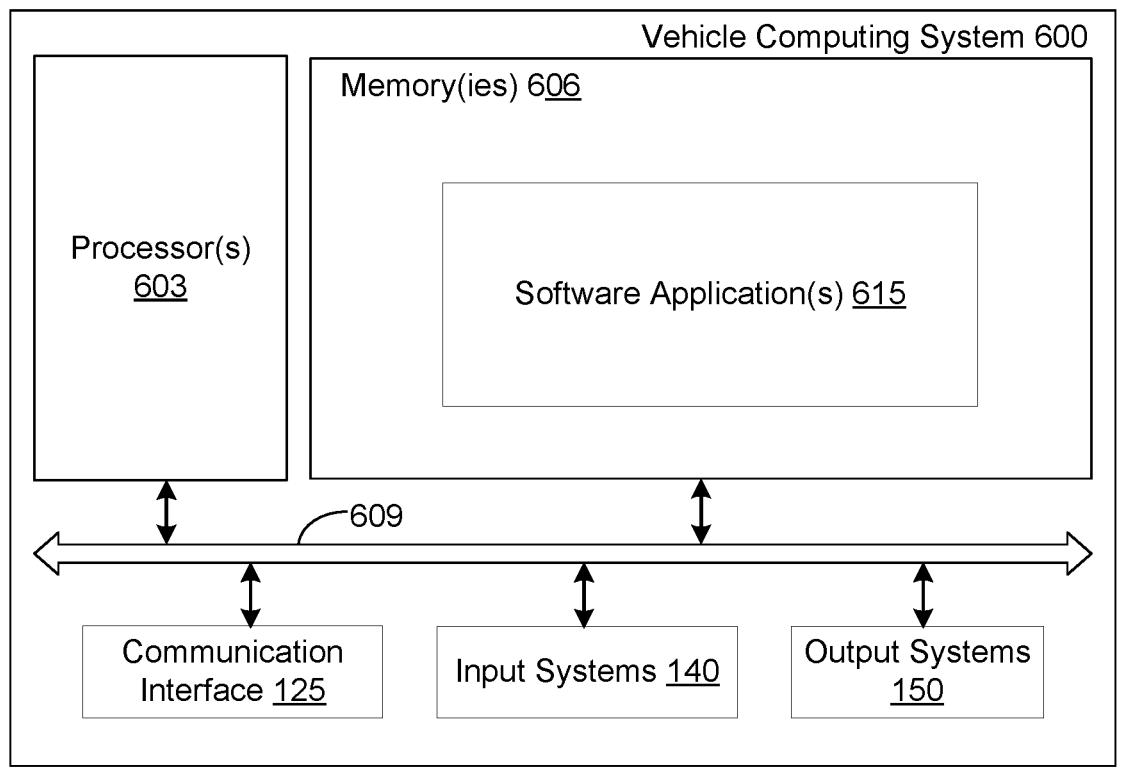
FIG. 6 is a schematic block diagram that provides one example illustration of a vehicle computing system according to various embodiments of the present disclosure.

FIG. 6 is a schematic block diagram that provides one example illustration of a vehicle computing system 600 according to various embodiments of the present disclosure. The vehicle computing system 600 may include one or more computing devices used to implement the computing functionality of a vehicle 103 in the networked environment 100 of FIG. 1. The vehicle computing system 600 includes at least one processor circuit, for example, having a processor 603 and memory 606, both of which are coupled to a local interface 609 or bus. The local interface 609 may comprise, for example, a data bus with an accompanying address/control bus or other bus structure as can be appreciated. The vehicle computing system 600 may be a computer made up of one or more devices that are installed in a vehicle. The vehicle computing system 600 may be used to implement the vehicle user interface 120 and/or communication interface 125. In addition, the vehicle computing system may carry out the method 500 described in FIG. 5.

Stored in the memory 606 are both data and several components that are executable by the processor 603. In particular, stored in the memory 606 and executable by the processor 603 is a software application 615. In addition, the memory 606 may store data for carrying out the operations of the vehicle user interface 120 or related software applications. For example, the software application 615 may facilitate the navigation of a menu system 130 by processing user selections and generating outputs.

It is understood that there may be other applications that are stored in the memory 606 and are executable by the processor 603 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, or other programming languages.

Several software components are stored in the memory 606 and are executable by the processor 603. In this respect, the term "executable" means a program file that is in a form that may ultimately be run by the processor 603. Examples of executable programs may be, for example, a compiled program that may be translated into machine code in a format that may be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may couple to additional systems such as the communication interface 125 to coordinate communication with remote systems. The local interface 609 may couple to various input systems 140 and output systems 150.

Figure 7:
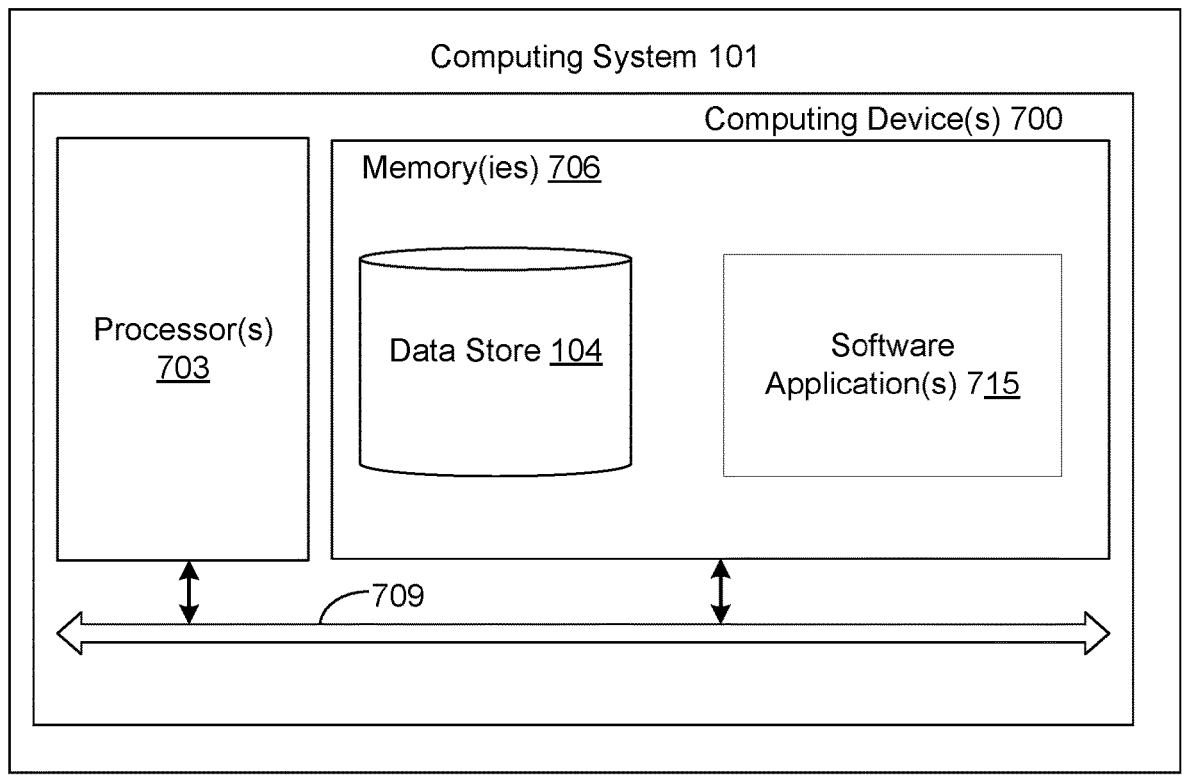
FIG. 7 is a schematic block diagram that provides one example illustration of a computing system according to various embodiments of the present disclosure.

FIG. 7 is a schematic block diagram that provides one example illustration of a computing system 101 according to various embodiments of the present disclosure. The computing system 101 may include one or more computing devices 700 used to implement the computing functionality of computing system 101 in the networked environment 100 of FIG. 1. A computing device 700 includes at least one processor circuit, for example, having a processor 703 and memory 706, both of which are coupled to a local interface 709 or bus. The local interface 709 may comprise, for example, a data bus with an accompanying address/control bus or other bus structure as can be appreciated. A computing system may carry out the method 400 described in FIG. 4.

Stored in the memory 706 are both data and several components that are executable by the processor 703. In particular, stored in the memory 706 and executable by the processor 703 is a data store 104 and one or more software applications 715. For example, the software applications 715 may comprise the recommendation engine 106 and its related components.

It is understood that there may be other applications that are stored in the memory 706 and are executable by the processor 703 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, or other programming languages.

Several software components are stored in the memory 706 and are executable by the processor 703. In this respect, the term "executable" means a program file that is in a form that may ultimately be run by the processor 703. Examples of executable programs may be, for example, a compiled program that may be translated into machine code in a format that may be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc.

Although components described herein may be embodied in software or code executed by hardware as discussed above, as an alternative the same may also be embodied in dedicated hardware or a combination of software/general purpose hardware and dedicated hardware. If embodied in dedicated hardware, each may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowcharts discussed above show the functionality and operation of an implementation of components within a vehicle or computing system 101. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowcharts may also comprise software or code that may be embodied in any non-transitory computer-readable medium for use by or in connection with an instruction execution system such as, for example, a processor in a computer system or other system. In this sense, the logic may comprise, for example, statements including instructions and declarations that may be fetched from the computer-readable medium and executed by the instruction execution system. In the context of the present disclosure, a "computer-readable medium" may be any medium that may contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including software application 106, may be implemented and structured in a variety of ways. For example, one or more applications described may be implemented as modules or components of a single application. Further, one or more applications described herein may be executed in shared or separate computing devices or a combination thereof. Additionally, it is understood that terms such as "application," "service," "system," "module," "engine" and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system comprising:
a processor; and
memory that stores a plurality of instructions, which, when executed, cause the processor to:
monitor user activities based on data collected by at least one sensor of a vehicle;
present user selectable options via a vehicle user interface;
transmit, to a computing system, sensor data regarding a set of user activities, wherein the sensor data is collected by the sensor, and wherein the computing system is configured to extract features from the set of user activities and generate a prediction model, and to identify a predicted option based on the prediction model;
automatically implement the predicted option when a confidence level of the predicted option is higher than a predetermined threshold;
instruct the vehicle user interface to present a notification of the implementation of the predicted option, the notification including a selection for overriding the implementation of the predicted option; and
cancel the implementation of the predicted option upon the selection being invoked.

2. The system of claim 1, wherein the at least one sensor includes a microphone configured to provide speech data.

3. The system of claim 2, wherein user input data regarding touch screen usage is collected, and the speech data and user input data are used to generate the prediction model.

4. The system of claim 3, wherein a time duration included in the speech data is used to generate the prediction model.

5. The system of claim 3, wherein the touch screen usage includes adjusting a volume level of an audio system of the vehicle.

6. The system of claim 1, wherein the user activities include behavior in operating the vehicle.

7. The system of claim 1, wherein the user activities include a location of the user in the vehicle.

8. A system comprising:
a microphone configured to provide speech data;
a vehicle user interface; and
a processor configured to:
monitor user activities based on sensor data collected by at least one sensor of a vehicle, wherein the sensor data is associated with user activities in the vehicle, and the sensor data includes the speech data;
present user selectable options via the vehicle user interface;
provide the collected sensor data as an input to a prediction model, wherein the prediction model is generated by extracting features from the sensor data, and the prediction model is configured to identify a predicted option;
automatically implement the predicted option when a confidence level of the predicted option is higher than a predetermined threshold;
instruct the vehicle user interface to present a notification of the implementation of the predicted option, the notification including a selection for overriding the implementation of the predicted option; and
cancel the implementation of the predicted option upon the selection being invoked.

9. The system of claim 8, wherein a time duration included in the speech data is used to generate the prediction model.

10. The system of claim 8, wherein the user activities include behavior in adjusting a volume level of an audio system of the vehicle.

11. The system of claim 8, wherein the predicted option is based on detecting input from the microphone of a time duration that exceeds a threshold.

12. The system of claim 11, wherein the predicted option is a reduction in volume of an audio system of the vehicle.

13. The system of claim 8, wherein timing between samples of the speech data is used as an input to the prediction model.

14. The system of claim 8, wherein the speech data includes conversation between at least two passengers of the vehicle.

15. The system of claim 14, wherein:
the predicted option is a reduction in volume of an audio system; and
the predicted option is based at least in part on identification of the conversation by the prediction model.

16. A method comprising:
monitoring user activities based on sensor data collected by at least one sensor of a vehicle;
providing the collected sensor data as an input to a prediction model, wherein the prediction model is generated by extracting features from the sensor data, and the prediction model is configured to identify a predicted option;
automatically implementing the predicted option when a confidence level of the predicted option is higher than a predetermined threshold;
instructing a vehicle user interface to present a notification of the implementation of the predicted option, the notification including a selection for overriding the implementation of the predicted option; and
cancelling the implementation of the predicted option upon the selection being invoked.

17. The method of claim 16, further comprising extracting features from data regarding touch screen usage that are used to generate the prediction model.

18. The method of claim 16, wherein the extracting features from the sensor data comprises extracting a cluster of features from the sensor data, the method further comprising:
establishing a confidence level of the cluster of features against the prediction model;
wherein the predicted option is identified when the confidence level is higher than a threshold.

19. The method of claim 16, wherein the predicted option is identified when a confidence level is higher than a threshold.

20. The method of claim 19, wherein the confidence level is based on a cluster of features extracted from the sensor data.

* * * * *